United States Patent
Andou et al.

(10) Patent No.: US 10,982,115 B2
(45) Date of Patent: Apr. 20, 2021

(54) ADHESIVE COMPOSITION

(71) Applicant: TOAGOSEI CO., LTD., Minato-ku (JP)

(72) Inventors: Masaru Andou, Nagoya (JP); Yuushi Andou, Takaoka (JP); Akitsugu Shibata, Nagoya (JP); Michihiro Kaai, Nagoya (JP)

(73) Assignee: TOAGOSEI CO., LTD., Minato-ku (JP)

( * ) Notice: Subject to any disclaimer, the term of this patent is extended or adjusted under 35 U.S.C. 154(b) by 0 days.

(21) Appl. No.: 16/607,692

(22) PCT Filed: Apr. 26, 2018

(86) PCT No.: PCT/JP2018/017090
§ 371 (c)(1),
(2) Date: Oct. 23, 2019

(87) PCT Pub. No.: WO2018/199269
PCT Pub. Date: Nov. 1, 2018

(65) Prior Publication Data
US 2020/0048499 A1    Feb. 13, 2020

(30) Foreign Application Priority Data
Apr. 26, 2017 (JP) .............................. JP2017-087410

(51) Int. Cl.
C09J 4/06     (2006.01)
C09J 133/20   (2006.01)

(52) U.S. Cl.
CPC ............... *C09J 4/06* (2013.01); *C09J 133/20* (2013.01)

(58) Field of Classification Search
CPC ............................. C09J 153/00; C08F 287/00
See application file for complete search history.

(56) References Cited

U.S. PATENT DOCUMENTS 4,440,910 A    4/1984   O'Connor

FOREIGN PATENT DOCUMENTS

| JP | 2007-045885 A | | 2/2007 |
| JP | 2007131763 A | * | 5/2007 |
| JP | 2011-144364 A | | 7/2011 |

* cited by examiner

Primary Examiner — Mark S Kaucher
(74) Attorney, Agent, or Firm — Bulkley, Richardson and Gelinas, LLP; Mary R. Bonzagni, Esq.

(57) ABSTRACT

An adhesive composition according to the present invention contains a polymerizable monomer (A) and a block copolymer (B) including a polymer block (a) which includes structural units derived from a styrene compound and from a maleimide compound, and an acrylic polymer block (b), in which the polymer block (a) and the acrylic polymer block (b) have a solubility parameter of 10.0 or more and 9.0 or more, respectively; the polymer block (a) contains the structural unit derived from a maleimide compound at a concentration from 30% by mass to 99% by mass with respect to the total mass of the polymer block (a); the polymer block (a) has a glass transition temperature of 150° C. or higher; and the polymer block (b) has a glass transition temperature of 20° C. or lower.

8 Claims, No Drawings

ADHESIVE COMPOSITION

RELATED APPLICATIONS

This application claims priority to PCT Application No. PCT/JP2018/017090, filed Apr. 26, 2018, which claims priority to Japanese Patent Application No. 2017-087410, filed Apr. 26, 2017, both of which are incorporated herein by reference in their entirety.

TECHNICAL FIELD

The present invention relates to an adhesive composition.

BACKGROUND ART

Sealing materials widely used in industrial settings include various elastomers, such as nitrile rubbers, acrylic rubbers, silicone rubbers, fluorine rubbers, and tetrafluoroethylene resins (PTFEs). Among those, acrylic rubbers, which are rubbery materials mainly composed of acrylate esters, have excellent heat and oil resistances and are thus widely used as materials of, for example, various hoses, adhesives, and coating materials, as well as materials of automotive gaskets, and sealing materials.

There is an increasing demand for improved heat and oil resistances in various types of materials including adhesives particularly in automotive applications, because the temperature in the engine room tends to rise due to increased engine power, placement of sound insulation materials for silence purposes, and the like.

In such a context, several elastomer compositions having high heat and oil resistances have been presented.

A thermoplastic elastomer composition which consists of an epoxy group-containing acrylic rubber (Component (A)), a thermoplastic polyester resin (Component (B)), and a certain graft copolymer composed of an olefin polymer segment and a vinyl copolymer segment, or a precursor thereof (Component (C)) and is obtained by cross-linking of the above Component (A) is disclosed in Patent Document 1.

Additionally, an acrylic rubber composition prepared by mixing a carboxyl group-containing acrylic rubber with at least one each of filler and foil filler is disclosed in Patent Document 2.

PRIOR ART DOCUMENTS

Patent Documents

Patent Document 1: Japanese Patent Application Laid-Open (JP-A) No. 2007-45885
Patent Document 2: JP-A No. 2011-144364
Patent Document 3: U.S. Pat. No. 4,440,910

SUMMARY OF INVENTION

Technical Problem

However, even the compositions described in Patent Documents 1 and 2 were far from being sufficient for applications demanding high heat and oil resistances and, furthermore, were far from being available as adhesives also in terms of fluidity.

In this respect, methods of providing an adhesive composition having elastomeric properties are widely known, to which those properties are imparted by mixing a polymerizable monomer with an elastomer composition and curing the resulting mixture by exposure to, for example, heat, light, or humidity. For example, a method of providing a rubber-toughened cyanoacrylic adhesive composition is disclosed in Patent Document 3, which is rubber-toughened by mixing a cyanoacrylate monomer with a particular organic polymer as an essentially elastomeric toughening additive. However, the bonding durability, such as cooling/heating cycle resistance, of a cured product of the adhesive is not enough to meet higher-level requirements, though the bonding durability is slightly improved by the toughening. Thus, an adhesive composition that can meet higher requirements of, for example, heat resistance, oil resistance, and cooling/heating cycle resistance has not yet been presented.

A problem solved by the invention is to provide an adhesive composition which can provide a cured product having excellent oil and cooling/heating cycle resistances.

Solution to Problem

The following aspects are included in the means for solving the problems.

<1> An adhesive composition, containing:
a polymerizable monomer (A), and
a block copolymer (B) including a polymer block (a) which comprises structural units derived from a styrene compound and from a maleimide compound, and an acrylic polymer block (b),
wherein the solubility parameter of the polymer block (a) is 10.0 or more;
the solubility parameter S of the acrylic polymer block (b) is 9.0 or more;
the polymer block (a) contains the structural unit derived from a maleimide compound at a concentration from 30% by mass to 99% by mass with respect to the total mass of the polymer block (a);
the polymer block (a) has a glass transition temperature of 150° C. or higher; and
the polymer block (b) has a glass transition temperature of 20° C. or lower.

<2> The adhesive composition according to <1>, wherein the polymer block (a) contains the structural unit derived from a styrene compound at a concentration from 1% by mass to 70% by mass with respect to the total mass of the polymer block (a).

<3> The adhesive composition according to <1>, wherein the structural unit derived from a maleimide compound is a structural unit represented by the following Formula (1):

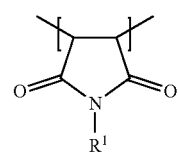

(1)

wherein, in Formula (1), $R^1$ represents hydrogen, an alkyl group having 1 to 3 carbon atoms, or -Ph-$R^2$; Ph represents phenylene group; and $R^2$ represents hydrogen, an alkyl group having 1 to 3 carbon atoms, hydroxy group, an alkoxy group having 1 or 2 carbon atoms, acetyl group, or halogen.

<4> The adhesive composition according any one of <1> to <3>, wherein the polymer block (a) comprises a structural unit derived from a vinyl compound having an amide group(s).

<5> The adhesive composition according any one of <1> to <4>, wherein the number-average molecular weight of the block copolymer (B) is from 10,000 to 500,000.

<6> The adhesive composition according any one of <1> to <5>, wherein the polymerizable monomer (A) is an ethylenically unsaturated compound.

<7> The adhesive composition according any one of <1> to <6>, wherein the polymerizable monomer (A) is at least one monomer selected from the group consisting of (meth) acrylate compounds and cyanoacrylate compounds.

<8> The adhesive composition according any one of <1> to <7>, wherein the content of the block copolymer (B) is from 1 part by mass to 100 parts by mass relative to 100 parts by mass of the polymerizable monomer (A).

<9> The adhesive composition according any one of <1> to <8>, which is an adhesive composition for bonding vehicle components.

Advantageous Effects of Invention

By the invention, an adhesive composition which can provide a cured product having excellent oil and cooling/heating cycle resistances can be provided.

DESCRIPTION OF EMBODIMENTS

Some of the constituent features in the following description are described by way of embodiments of the invention, but the invention is not limited to such embodiments. In the present specification, the word "to" used to connect a pair of numerals is used to represent a numerical range including the numerals followed by and following "to" as the lower and upper limits.

In the invention, the term "% by mass" is synonymous with the term "% by weight," while the term "part by mass" is synonymous with the term "part by weight."

Additionally, in the invention, a combination of two or more preferable aspects will be a more preferable aspect.

Now, the subject matter of the invention will be described in detail below.

(Adhesive Composition)

An adhesive composition according to the present invention contains a polymerizable monomer (A) and a block copolymer (B) including a polymer block (a) which includes structural units derived from a styrene compound and from a maleimide compound, and an acrylic polymer block (b), in which the polymer block (a) and the acrylic polymer block (b) have a solubility parameter of 10.0 or more and 9.0 or more, respectively; the polymer block (a) contains the structural unit derived from a maleimide compound at a concentration from 30% by mass to 99% by mass with respect to the total mass of the polymer block (a); the polymer block (a) has a glass transition temperature of 150° C. or higher; and the polymer block (b) has a glass transition temperature of 20° C. or lower.

The adhesive composition of the invention can be suitably used as an adhesive composition for bonding vehicle components.

The present inventors intensively studied and consequently found that an adhesive composition which can provide a cured product having excellent oil and cooling/heating cycle resistances can be provided by adopting the above-described configuration.

The mechanism how the configuration is involved in exertion of excellent effects is not clear but is estimated as follows.

It is estimated that, in the block copolymer (B), the block (a) having a glass transition temperature of 150° C. or higher and the block (b) having a glass transition temperature of 20° C. or lower function as a hard segment and a soft segment, respectively.

It is estimated that a cured product of the composition has excellent cooling/heating cycle resistance achieved by physical cross-linking of the block copolymer (B) in the cured product due to the presence of the hard segment, and also has excellent oil resistance achieved by reduction in the lipophilicity of the cured product due to the SP value of the hard segment of 10.0 or more and the SP value of the soft segment of 9.0 or more.

Additionally, the adhesive composition of the invention provides a cured product having excellent cooling/heating cycle resistance even in cases where the adhesive composition is used for bonding particularly between different types of adherends (for example, between a metal and a resin).

<Polymerizable Monomer (A)>

The adhesive composition of the invention includes a polymerizable monomer (A).

The polymerizable monomer is not limited to a particular polymerizable monomer and any known polymerizable monomer can be used as long as the polymerizable monomer is a monomer that is polymerized and cured by exposure to, for example, heat, light, or humidity and thereby functions as an adhesive.

The polymerizable monomer may be a radical-polymerizable monomer, an anionic polymerizable monomer, or a cationic polymerizable monomer, and examples of the polymerizable monomer preferably include acrylic monomers, cyanoacrylic monomers, and epoxy monomers.

Additionally, examples of the polymerizable monomer preferably include ethylenically unsaturated compounds, more preferably at least one monomer selected from the group consisting of (meth)acrylate compounds and cyanoacrylate compounds, in terms of the curing property, and the lipophilicity and cooling/heating cycle resistance of a cured product.

Examples of the polymerizable monomer preferably include radical-polymerizable monomers.

Examples of the radical-polymerizable group in the radical-polymerizable monomer include (meth)acryloyl group, such as (meth)acrylic group; styrene group, acrylonitrile group, vinyl ester group, N-vinylpyrrolidone group, acrylamide group, conjugated diene group, vinyl ketone group, and vinyl chloride group. Among those, radical-polymerizable monomers having a (meth)acryloyl group(s) are preferred.

Additionally, examples of the polymerizable monomer also preferably include anionic polymerizable monomers.

Examples of the anionic polymerizable group in the anionic polymerizable monomer include (meth)acryloyl group, such as (meth)acrylic group; styrene group, acrylonitrile group, N-vinylpyrrolidone group, acrylamide group, conjugated diene group, and vinyl ketone group. Among those, anionic polymerizable monomers having a (meth)acryloyl group(s) are preferred.

Specific examples of the monomer include (meth)acrylate monomers, styrene monomers, acrylonitrile, vinyl ester monomers, N-vinylpyrrolidone, acrylamide monomers, conjugated diene monomers, vinyl ketone monomers, halogenated vinyl/halogenated vinylidene monomers, and polyfunctional monomers.

Examples of the (meth)acrylate monomers include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide-modified (meth)acrylic acid, trifluoromethylmethyl (meth)acrylate, 2-trifluoromethyl ethyl (meth)acrylate, 2-perfluoroethyl ethyl (meth)acrylate, 2-perfluoroethyl-2-perfluorobutylethyl (meth)acrylate, 2-perfluoroethyl (meth)acrylate, perfluoromethyl (meth)acrylate, di(perfluoromethylmethyl) (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and isobornyl acrylate.

Preferably, (meth)acrylate monomers having a cyclic structure, more preferably (meth)acrylate monomers having an alicyclic structure, are also included.

Examples of the styrene monomers include styrene and α-methylstyrene. Examples of the vinyl ester monomers include vinyl acetate, vinyl propionate, and vinyl butyrate. Examples of the acrylamide monomers include acrylamide and N,N-dimethylacrylamide. Examples of the conjugated diene monomers include butadiene and isoprene. Examples of the vinyl ketone monomers include methyl vinyl ketone. Examples of the halogenated vinyl/halogenated vinylidene monomers include vinyl chloride, vinyl bromide, vinyl iodide, vinylidene chloride, and vinylidene bromide.

Examples of the polyfunctional monomers include trimethylolpropane triacrylate, neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl)isocyanurate polyhexanolide triacrylate, tricyclodecane dimethylol diacrylate 2-(2-acryloyloxy-1,1-dimethyl)-5-ethyl-5-acryloyloxymethyl-1,3-dioxane, tetrabromo bisphenol A diethoxy diacrylate, 4,4-dimercaptodiphenyl sulfide dimethacrylate, poly(tetraethylene glycol diacrylate), 1,9-nonanediol diacrylate, and di(trimethylolpropane) tetraacrylate.

Additionally, the polymerizable monomer may be an oligomer or polymer having a polymerizable group(s).

Examples of the oligomer include epoxy acrylate resins, such as bisphenol A-type epoxy acrylate resins, phenol novolac-type epoxy acrylate resins, cresol novolac-type epoxy acrylate resins, and carboxyl group-modified epoxy acrylate resins; urethane acrylate resins obtained by reaction of urethane resins obtained from a polyol (such as poly(tetramethylene glycol), polyester diols of ethylene glycol and adipic acid, ε-caprolactone-modified polyester diols, polypropylene glycol, polyethylene glycol, polycarbonate diols, hydroxy group-terminated hydrogenated polyisoprene, hydroxy group-terminated polybutadiene, or hydroxy group-terminated polyisobutylene) and an organic isocyanate (such as tolylene diisocyanate, isophorone diisocyanate, diphenylmethane diisocyanate, hexamethylene diisocyanate, or xylylene diisocyanate) with a hydroxy group-containing (meth)acrylate (such as hydroxyethyl (meth)acrylate, hydroxypropyl (meth)acrylate, hydroxybutyl (meth)acrylate, or pentaerythritol triacrylate); resins obtained by introducing a (meth)acrylic group(s) into the polyols via ester bond; polyester acrylate resins, and poly(meth)acrylacrylate resins (poly(meth)acrylic acid ester resins containing polymerizable reactive groups).

Examples of the polymerizable monomer preferably include cyanoacrylic monomers.

The cyanoacrylic monomer is preferably a 2-cyanoacrylate compound.

As the 2-cyanoacrylate compound, a 2-cyanoacrylate compound commonly used for this type of adhesive composition can be used without particular limitation. Examples of the 2-cyanoacrylate compound include esters of 2-cyanoacrylic acid with, for example, methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl.

Additionally, among those 2-cyanoacrylate compounds, alkyl 2-cyanoacrylates or alkoxyalkyl 2-cyanoacrylates are preferred, and ethyl 2-cyanoacrylate or ethoxyethyl 2-cyanoacrylate is more preferred, in terms of excellent curing property. Furthermore, alkyl 2-cyanoacrylates are preferred in terms of curing property and versatility, while alkoxyalkyl 2-cyanoacrylates are preferred in terms of the cooling/heating cycle resistance after curing process.

As the polymerizable monomer, a cationic polymerizable monomer may also be used.

Examples of the cationic polymerizable monomer include epoxy monomers such as epoxy compounds.

Various epoxy compounds can be used as long as those compounds contain one or more epoxy groups per molecule, and preferred examples of the compound can include diglycidyl ethers of diols containing two to ten carbon atoms, alicyclic epoxy group-containing compounds, and aromatic epoxy group-containing compounds.

The epoxy compounds preferably include diglycidyl ethers of diols containing two to ten carbon atoms.

The "carbon number" of a diol containing two to ten carbon atoms refers to the number of carbon atoms included in the moiety remaining after removing the hydroxy groups.

Specific examples of the diglycidyl ethers of diols containing two to ten carbon atoms include ethylene glycol diglycidyl ether, propylene glycol diglycidyl ether, 1,4-butanediol diglycidyl ether, neopentyl glycol diglycidyl ether, 1,6-hexanediol diglycidyl ether, cyclohexanedimethylol diglycidyl ether, 1,9-nonanedioldiglycidyl ether, diethylene glycol diglycidyl ether, triethylene glycol diglycidyl ether, dipropylene glycol diglycidyl ether, tripropylene glycol diglycidyl ether, hydroquinone diglycidyl ether, and resorcin diglycidyl ether.

As the diglycidyl ethers of diols containing two to ten carbon atoms, diglycidyl ethers of alkane diols containing four to six carbon atoms, such as 1,4-butanediol diglycidyl ether, neopentyl glycol diglycidyl ether, and 1,6-hexanediol diglycidyl ether, are more preferred in terms of the low viscosity of obtained compositions, the excellent adhesive strength and, furthermore, colorless transparency of cured products.

Examples of the epoxy compound preferably include alicyclic epoxy group-containing compounds.

Specific examples of the alicyclic epoxy group-containing compounds include 3,4-epoxycyclohexylmethyl-3,4-epoxycyclohexane carboxylate, bis(3,4-epoxy cyclohexylmethyl) adipate, caprolactone-modified 3,4-epoxycyclohexylmethyl-3,4-epoxycyclohexane carboxylate, esters of polyvalent carboxylic acids and 3,4-epoxycyclohexylmethyl alcohol or caprolactone-modified products thereof, 3,4,3',4'-diepoxybicyclohexyl, limonene dioxide, 4-vinylcyclohexene dioxide, 2-(3,4-epoxy cyclohexyl)ethyl trimethoxysilane, silsesquioxanes containing an alicyclic epoxy group(s), and silicone polymers containing an alicyclic epoxy group(s).

As the alicyclic epoxy group-containing compounds, alicyclic epoxy group-containing compounds having two alicyclic epoxy groups per molecule and having a molecular weight of 200 to 500 are more preferred in terms of the low viscosity of obtained compositions and the excellent adhesive strength of cured products.

Examples of the epoxy compound preferably include aromatic epoxy group-containing compounds.

Specific examples of the aromatic epoxy group-containing compounds include bisphenol A diglycidyl ether, bisphenol F diglycidyl ether, brominated bisphenol A diglycidyl ether, phenol novolac-type epoxy resins, cresol novolac-type epoxy resins, biphenyl-type epoxy resins, diglycidyl terephthalate, diglycidyl phthalate, and reaction products from the reaction between carboxylic acid-terminated polybutadienes and bisphenol A-type epoxy resins.

Additionally, other epoxy compounds other than the above-described compounds can also be used as the epoxy compound.

Specific examples of the other epoxy compounds include diglycidyl ethers of diols containing 11 or more carbon atoms, such as a diglycidyl ether of polyethylene glycol (a repeating number of 6 or more), a diglycidyl ether of polypropylene glycol (a repeating number of 4 or more), a diglycidyl ether of poly(tetramethylene glycol) (a repeating number of 3 or more), hydrogenated bisphenol A diglycidyl ether, and polybutadiene diglycidyl ether having hydroxy groups on both terminals.

Furthermore, examples of the other epoxy compounds include epoxydized vegetable oils, 3-glycidoxypropyl trimethoxysilane, 3-glycidoxypropylmethyl dimethoxysilane, internally epoxydized polybutadienes, styrene-butadiene copolymers with some of the double bonds converted to epoxy groups (for example, "EPOFRIEND" manufactured by Daicel Chemical Industries, Ltd.), and block copolymers of ethylene-butylene copolymer and polyisoprene with some isoprene units epoxydized (for example, "L-207" manufactured by Kraton Corporation).

The polymerizable monomers used for the adhesive composition of the invention may be used singly, or in combination of two or more kinds thereof.

The content of the polymerizable monomer in the adhesive composition of the invention is preferably 40% by mass or more but 99.5% by mass or less, more preferably 50% by mass or more but 99% by mass or less, yet more preferably 70% by mass or more but 98% by mass or less, particularly preferably 80% by mass or more but 95% by mass or less, with respect to the total mass of the adhesive composition in terms of adhesive and curing properties.

<Block Copolymer (B)>

The adhesive composition of the invention contains a block copolymer (B).

The block copolymer (B) used in the invention is a block copolymer including a polymer block (a) which includes structural units derived from a styrene compound and from a maleimide compound (also simply referred to as "block (a)"), and an acrylic polymer block (b) (also simply referred to as "block (b)"), in which the polymer block (a) and the acrylic polymer block (b) have a solubility parameter (a SP value) of 10.0 or more and 9.0 or more, respectively; the polymer block (a) contains the structural unit derived from a maleimide compound at a concentration from 30% by mass to 99% by mass with respect to the total mass of the polymer block (a); the polymer block (a) has a glass transition temperature (Tg) of 150° C. or higher; and the polymer block (b) has a glass transition temperature of 20° C. or lower.

It is estimated that, in the block copolymer (B) of the invention, the block (a) having a glass transition temperature of 150° C. or higher and the block (b) having a glass transition temperature of 20° C. or lower function as a hard segment and a soft segment, respectively, as described above.

The Tg of the block (a) is 150° C. or higher, and is preferably 200° C. or higher in terms of the heat and cooling/heating cycle resistances after curing process.

Additionally, the Tg of the block (a) is preferably 350° C. or lower, more preferably 300° C. or lower.

The Tg of the block (b) is 20° C. or lower, and is preferably 0° C. or lower, more preferably −20° C. or lower. Although flexibility would be achieved even at room temperature (25° C.) by a block (b) having a Tg of 20° C. or lower, flexibility is increasingly enhanced even in a cool environment by a block (b) having a lower Tg, which improves the cooling/heating cycle resistance after curing process.

Additionally, the Tg of the block (b) is preferably −100° C. or higher, more preferably −80° C. or higher.

The Tg value can be determined by differential scanning calorimetry (DSC), as described in Examples below.

The block copolymer (B) may include two or more blocks (a), or may include two or more blocks (b), in which each block (a) or (b) may have an identical or different structure.

The structure of the block copolymer (B) is also not limited to a particular structure, and various linear or branched block copolymers, such as AB diblock polymers, and ABA and ABC triblock polymers, can be used as the block copolymer. A block copolymer having the A-(BA)$_n$ structure, such as an ABA triblock copolymer having the structure: block (a)-block (b)-block (a), is preferred in terms of the ability to achieve favorable properties for elastomeric materials.

The total content of the blocks (a) and (b) in the block copolymer (B) is preferably 80% by mass or more, more preferably 90% by mass or more, yet more preferably 95% by mass or more, with respect to the total mass of the block copolymer (B) in terms of the oil and cooling/heating cycle resistances of a cured product. Additionally, the block copolymer (B) is preferably a block copolymer composed of the blocks (a) and (b).

Additionally, the total number of the blocks (a) and (b) in the block copolymer (B) is preferably 2 or more but 7 or less, more preferably 2 or more but 5 or less, yet more preferably 3, in terms of the oil and cooling/heating cycle resistances of a cured product.

Furthermore, the block copolymer (B) is particularly preferably a triblock copolymer having the structure: block (a)-block (b)-block (a), in terms of the oil and cooling/heating cycle resistances of a cured product.

—Block (a)—

The block copolymer (B) used in the invention includes at least a polymer block (a) including structural units derived from a styrene compound and from a maleimide compound.

Examples of the maleimide compound that can be included in the polymer block (a) include maleimide and N-substituted maleimide compounds. Examples of the N-substituted maleimide compounds include N-alkyl-substituted maleimide compounds, such as N-methylmaleimide, N-ethylmaleimide, N-n-propylmaleimide, N-isopropylmaleimide, N-n-butylmaleimide, N-isobutylmaleimide, N-tert-butylmaleimide, N-pentylmaleimide, N-hexylmaleimide, N-heptylmaleimide, N-octylmaleimide, N-laurylmaleimide, and N-stearylmaleimide; N-cycloalkyl-sub stituted maleimide compounds, such as N-cyclopentylmaleimide and N-cyclohexylmaleimide; N-aryl-substituted maleimide compounds, such as N-phenylmaleimide, N-(4-hydroxyphenyl)maleimide, N-(4-acetylphenyl)maleimide, N-(4-methoxyphenyl)maleimide, N-(4-ethoxyphenyl)maleimide, N-(4-chlorophenyl)maleimide, N-(4-bromophenyl)maleimide, and N-benzylmaleimide, and one or more of these maleimide compounds can be used. A structural unit derived from a maleimide compound can be introduced into a block (a) by polymerization of a monomer including the maleimide compound.

In this respect, the structural unit derived from a maleimide compound preferably includes at least a structural unit represented by the following Formula (1) in terms of the oil and cooling/heating cycle resistances of a cured product:

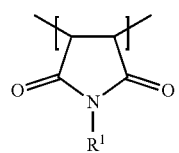

(1)

wherein, in Formula (1), $R^1$ represents hydrogen atom, an alkyl group, or an aryl group.

The alkyl group as $R^1$ in the Formula (1) preferably has 1 to 12, more preferably 1 to 8, yet more preferably 1 to 3, carbon atoms. Additionally, the alkyl group may have a linear, branched, or cyclic structure, and may also have any of the following substituents.

The substituents include hydroxy group, alkoxy groups, acetyl group, halogen atoms, and aryl groups.

The aryl group as $R^1$ in the Formula (1) preferably has 6 to 20, more preferably 6 to 10, yet more preferably 6 to 8, carbon atoms. Additionally, the aryl group may have any of the following substituents.

The substituents include hydroxy group, alkoxy groups, acetyl group, halogen atoms, alkyl groups, and aryl groups.

Additionally, the aryl group as $R^1$ in the Formula (1) is preferably represented by -Ph-$R^2$, wherein Ph represents phenylene group and $R^2$ represents hydrogen atom, an alkyl group, hydroxy group, an alkoxy group, acetyl group, or a halogen atom.

In the Formula (1), $R^1$ preferably represents hydrogen atom, an alkyl group having 1 to 3 carbon atoms, or -Ph-$R^2$, more preferably an alkyl group having 1 to 3 carbon atoms or -Ph-$R^2$, yet more preferably -Ph-$R^2$.

The $R^2$ preferably represents hydrogen atom, an alkyl group having 1 to 3 carbon atoms, hydroxy group, an alkoxy group having 1 or 2 carbon atoms, acetyl group, or a halogen atom, more preferably hydrogen atom.

The content ratio of the structural unit derived from a maleimide compound in the block (a) with respect to the total mass of the block (a) is from 30% by mass to 99% by mass, and is preferably from 30% by mass to 95% by mass, more preferably from 30% by mass to 90% by mass, particularly preferably from 40% by mass to 80% by mass, in terms of the oil and cooling/heating cycle resistances of a cured product.

Examples of the styrene compound that can be included in the polymer block (a) include styrene and derivatives thereof. Specific examples of the compound include styrene, α-methylstyrene, β-methylstyrene, vinyltoluene, vinylxylene, vinylnaphthalene, o-methylstyrene, m-methylstyrene, p-methylstyrene, o-ethylstyrene, m-ethylstyrene, p-ethylstyrene, p-n-butylstyrene, p-isobutylstyrene, p-t-butylstyrene, o-methoxystyrene, m-methoxystyrene, p-methoxystyrene, o-chloromethylstyrene, p-chloromethylstyrene, o-chlorostyrene, p-chlorostyrene, o-hydroxystyrene, m-hydroxystyrene, p-hydroxystyrene, and divinylbenzene, and one or more of these styrene compounds can be used. A structural unit derived from a styrene compound can be introduced into a block (a) by polymerization of a monomer including the styrene compound.

In this respect, at least one compound is preferably selected from the group consisting of styrene, α-methylstyrene, o-methoxystyrene, m-methoxystyrene, p-methoxystyrene, o-hydroxystyrene, m-hydroxystyrene, and p-hydroxystyrene, in terms of polymerizing property.

In this respect, the block (a) preferably includes at least a structural unit represented by the following Formula (2) as the structural unit derived from a styrene compound, in terms of the oil and cooling/heating cycle resistances of a cured product:

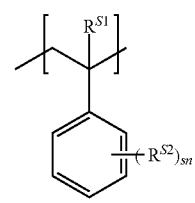

(2)

wherein, in Formula (2), $R^{S1}$ represents hydrogen atom or methyl group, and each $R^{S2}$ independently represents an alkyl group, an alkoxy group, hydroxy group, or a halogen atom, and sn represents an integer of 0 to 5.

In Formula (2), each $R^{S2}$ preferably independently represents an alkyl group, an alkoxy group, hydroxy group, or chlorine atom, more preferably an alkyl group having 1 to 4 carbon atoms, an alkoxy group having 1 to 4 carbon atoms, hydroxy group, or chlorine atom. In Formula (2), sn is preferably an integer of 0 to 2, more preferably 0 or 1, particularly preferably 0.

The content ratio of the structural unit derived from a styrene compound in the block (a) with respect to the total mass of the block (a) is preferably from 1% by mass to 70% by mass, more preferably from 5% by mass to 70% by mass, yet more preferably from 10% by mass to 70% by mass, particularly preferably from 20% by mass to 60% by mass, in terms of the oil and cooling/heating cycle resistances of a cured product.

The block (a) may also include a structural unit derived from an additional monomer, in addition to the above-described structural units derived from a maleimide compound and from a styrene compound.

Examples of the additional monomer include (meth)acrylate compounds, amide group-containing vinyl compounds, amino group-containing vinyl compounds, unsaturated carboxylic acids, unsaturated acid anhydrides, and hydroxy group-containing vinyl compounds. These compounds may be used singly, or in combination of two or more kinds thereof.

The block (a) preferably includes a structural unit derived from an amide group-containing vinyl compound, among those monomers, in terms of the compatibility with the polymerizable monomer.

In a case in which a structural unit derived from the additional monomer is included, the content ratio of the structural unit derived from the additional monomer in the block (a) with respect to the total mass of the block (a) is preferably from 1% by mass to 50% by mass, more preferably from 5% by mass to 45% by mass, yet more preferably from 10% by mass to 40% by mass.

Specific examples of alkyl (meth)acrylate compounds include alkyl (meth)acrylate compounds, such as methyl (meth)acrylate, ethyl (meth)acrylate, isopropyl (meth)acrylate, n-propyl (meth)acrylate, n-butyl (meth)acrylate, isobutyl (meth)acrylate, tert-butyl (meth)acrylate, (meth) acrylate hexyl, 2-ethylhexyl (meth)acrylate, n-octyl (meth)acrylate, isooctyl (meth)acrylate, n-nonyl (meth)acrylate, isononyl (meth)acrylate, decyl (meth)acrylate, and dodecyl (meth)acrylate;

alicyclic (meth)acrylate compounds, such as cyclohexyl (meth)acrylate, methylcyclohexyl (meth)acrylate, tert-butylcyclohexyl (meth)acrylatecy, cyclododecyl (meth)acrylate, isobornyl (meth)acrylate, adamantyl (meth)acrylate, dicyclopentenyl (meth)acrylate, and dicyclopentanyl (meth) acrylate; and alkoxyalkyl (meth)acrylate compounds, such as methoxymethyl(meth)acrylate, ethoxymethyl (meth)acrylate, methoxyethyl (meth)acrylate, ethoxyethyl (meth)acrylate, n-propoxyethyl (meth)acrylate, n-butoxyethyl (meth)acrylate, methoxypropyl (meth)acrylate, ethoxypropyl (meth) acrylate, n-propoxypropyl (meth)acrylate, n-butoxypropyl (meth)acrylate, methoxybutyl (meth)acrylate, ethoxybutyl (meth)acrylate, n-propoxybutyl (meth)acrylate, and n-butoxybutyl (meth)acrylate.

Examples of the amide group-containing vinyl compounds include (meth)acrylamide and (meth)acrylamide derivatives, such as tert-butyl (meth)acrylamide, N,N-dimethyl (meth)acrylamide, N,N-diethyl (meth)acrylamide, N-isopropyl (meth)acrylamide, N,N-dimethylaminopropyl (meth)acrylamide, and (meth)acryloyl morpholine; and N-vinylamide monomers, such as N-vinylacetamide, N-vinylformamide, and N-vinylisobutylamide.

Examples of the amino group-containing vinyl compounds include N,N-dimethyl aminoethyl (meth)acrylate, N,N-diethylaminoethyl (meth)acrylate, and N,N-dimethyl aminopropyl (meth)acrylate.

Examples of the unsaturated carboxylic acids include (meth)acrylic acid, maleic acid, fumaric acid, itaconic acid, crotonic acid, citraconic acid, cinnamic acid, and furthermore monoalkyl esters of unsaturated dicarboxylic acids (monoalkyl esters of, for example, maleic acid, fumaric acid, itaconic acid, citraconic acid, maleic anhydride, itaconic anhydride, and citraconic anhydride). These compounds may be used singly, or in combination of two or more kinds thereof.

Examples of the unsaturated acid anhydrides include maleic anhydride, itaconic anhydride, and citraconic anhydride.

Examples of the hydroxy group-containing vinyl compounds include 2-hydroxyethyl (meth)acrylic acid, 2-hydroxypropyl (meth)acrylate, 3-hydroxypropyl (meth)acrylate, 2-hydroxybutyl (meth)acrylate, 3-hydroxybutyl (meth) acrylate, 4-hydroxybutyl (meth)acrylate, and mono(meth) acrylate esters of polyalkylene glycols, such as polyethylene glycol and polypropylene glycol.

The solubility parameter (the SP value; in the unit of $(cal/cm^3)^{1/2}$, unless otherwise expressly stated) of the block (a) is 10.0 $(cal/cm^3)^{1/2}$ or more, and is preferably 11.0 $(cal/cm^3)^{1/2}$ or more, more preferably 12.0 $(cal/cm^3)^{1/2}$ or more, in terms of the oil resistance after curing process. Additionally, the maximum SP value of the block (a) is not limited to a particular value, but is preferably 30 $(cal/cm^3)^{1/2}$ or less.

In the invention, the SP value can be determined based on the calculation method described in R. F. Fedors, "Polymer Engineering and Science," 14 (2), 147 (1974). Specifically, the calculation method is shown in Formula (3).

$$\delta = \sqrt{\frac{\sum \Delta E_{vap}}{\sum V}} \quad (3)$$

$\delta$: SP value $[(cal/cm^3)^{1/2}]$ $\Delta E_{vap}$: the molar heat of vaporization with respect to each atomic group (cal/mol)

V: the molar volume with respect to each atomic group $(cm^3/mol)$

—Block (b)—

The block copolymer (B) used in the invention includes at least an acrylic polymer block (b).

The block (b) is any block as long as the block has a Tg of 20° C. or lower and can be synthesized, and is not limited to a particular block.

The acrylic polymer block (b) in the invention is a block which includes a structural unit derived from an acrylic compound at a concentration of 50% by mass or more with respect to the total mass of the block, and is preferably a block which includes a structural unit derived from an acrylic compound at a concentration of 80% by mass or more with respect to the total mass of the block, more preferably a block which includes a structural unit derived from an acrylic compound at a concentration of 90% by mass or more with respect to the total mass of the block, particularly preferably a block consisting of a structural unit derived from an acrylic compound.

The SP value of the block (b) is 9.0 $(cal/cm^3)^{1/2}$ or more, and is preferably 9.5 $(cal/cm^3)^{1/2}$ or more, more preferably 9.7 $(cal/cm^3)^{1/2}$ or more, in terms of the oil and cooling/heating cycle resistances after curing process.

The maximum SP value of the block (b) is preferably 20 $(cal/cm^3)^{1/2}$ or less in consideration of the expression of thermoplasticity.

The absolute value of the difference in SP value between the blocks (a) and (b) is preferably 0.3 $(cal/cm^3)^{1/2}$ or more, more preferably 0.5 $(cal/cm^3)^{1/2}$ or more, yet more preferably 0.8 $(cal/cm^3)^{1/2}$ or more, particularly preferably 1.0 $(cal/cm^3)^{1/2}$ or more, in terms of the cooling/heating cycle resistance after curing process. Additionally, the difference in SP value between the blocks (a) and (b) is preferably 5.0 $(cal/cm^3)^{1/2}$ or less in terms of the compatibility with the polymerizable monomer. In this respect, 2.0455 $(cal/cm^3)^{1/2}$ is equal to 1 $MPa^{1/2}$.

The acrylic polymer block can be obtained by polymerization of a monomer including an acrylic monomer. The acrylic monomer refers to an unsaturated compound containing an acryloyl group(s), such as acrylic acid or an acrylate compound.

Examples of the acrylate compound include alkyl acrylate compounds, such as methyl acrylate, ethyl acrylate, n-propyl acrylate, isopropyl acrylate, n-butyl acrylate, isobutyl acrylate, tert-butyl acrylate, hexyl acrylate, 2-ethylhexyl acrylate, octyl acrylate, nonyl acrylate, decyl acrylate, lauryl acrylate, and stearyl acrylate;

alicyclic acrylate compounds, such as cyclohexyl acrylate, methylcyclohexyl acrylate, tert-butylcyclohexyl acrylate, and cyclododecyl acrylate; and alkoxyalkyl acrylate compounds, such as methoxymethyl acrylate, ethoxymethyl acrylate, methoxyethyl acrylate, ethoxyethyl acrylate, n-propoxyethyl acrylate, n-butoxyethyl acrylate, methoxypropyl acrylate, ethoxypropyl acrylate, n-propoxypropyl acrylate, n-butoxypropyl acrylate, methoxybutyl acrylate, ethoxybutyl acrylate, n-propoxybutyl acrylate, and n-butoxybutyl acrylate. Additionally, acrylate compounds containing a functional group(s), such as amide group, amino group, carboxyl group and/or hydroxy group, may be used.

Among those compounds, alkyl acrylate compounds containing an alkyl group having 1 to 12 carbon atoms or an alkoxyalkyl group having 2 to 8 carbon atoms are preferred in terms of the ability to achieve excellent flexibility in block copolymers. Additionally, the acrylic monomers more preferably include alkyl acrylate compounds containing an alkyl group having 1 to 3 carbon atoms or an alkoxyalkyl group having 2 or 3 carbon atoms, with taking the heat and oil resistances into consideration.

The content ratio of the structural unit derived from an acrylic monomer in the block (b) with respect to the total mass of the block (b) is preferably from 50% by mass to 100% by mass, more preferably from 80% by mass to 100% by mass, particularly preferably from 90% by mass to 100% by mass, in terms of the oil and cooling/heating cycle resistances and mechanical properties after curing process.

The block (b) may also include a structural unit derived from an additional monomer, in addition to the structural unit derived from an acrylic monomer, to the extent that the effects derived from the invention are not disturbed.

As the monomer additional to the acrylic monomer, a monomer containing an unsaturated group(s) except for acryloyl group can be used, including, for example, methacryloyl group-containing compounds, such as methacrylic esters; and aliphatic or aromatic vinyl compounds, such as alkyl vinyl esters, alkyl vinyl ethers, and styrene compounds.

The content of the block (a) in the block copolymer (B) with respect to the total mass of the block copolymer (B) is preferably from 10% by mass to 60% by mass, more preferably from 20% by mass to 50% by mass, in terms of the oil and cooling/heating cycle resistances of a cured product.

Additionally, the content of the block (b) in the block copolymer (B) with respect to the total mass of the block copolymer (B) is preferably from 40% by mass to 90% by mass, more preferably from 50% by mass to 80% by mass, in terms of the oil and cooling/heating cycle resistances of a cured product.

The number-average molecular weight (Mn) of the block copolymer (B) is preferably from 10,000 to 500,000, more preferably from 20,000 to 400,000, yet more preferably 50,000 to 200,000, in consideration of the compatibility with the polymerizable monomer, the viscosity of the composition, and the adhesion strength after curing process.

Additionally, the molecular weight distribution (Mw/Mn) of the block copolymer (B), which is obtained by dividing the weight-average molecular weight (Mw) value by the number-average molecular weight (Mn) value, is preferably 1.5 or less, more preferably 1.4 or less, yet more preferably 1.3 or less, particularly preferably 1.2 or less, in terms of the compatibility with the polymerizable monomer. The lower limit of molecular weight distribution is 1.0.

The values of the number-average molecular weight (Mn) and weight-average molecular weight (Mw) of the resin according to the invention can be determined by gel permeation chromatography (GPC), as described in Examples below.

The content of the block copolymer (B) in the adhesive composition of the invention is preferably 1 part by mass or more, more preferably 5 parts by mass or more, yet more preferably 10 parts by mass or more, relative to 100 parts by mass of the polymerizable monomer (A), in terms of the oil and cooling/heating cycle resistances of a cured product, while being preferably 100 parts by mass or less in terms of adhesion rate and viscosity.

<<Production Method for Block Copolymer (B) (Block Copolymer)>>

For the block copolymer (B), any known production method is applicable, without particular limitation, as long as a block copolymer including at least the blocks (a) and (b) is obtained. Examples of the production method can include a method in which a variety of controlled polymerization techniques, such as living radical polymerization or living anionic polymerization, is utilized, and a method in which polymers having a functional group(s) are coupled. Among those, the living radical polymerization method is preferred, and the below-described RAFT polymerization method is more preferred, in terms of ease of operation, applicability to a wide variety of monomers, and storage stability of products. A block copolymer (B) obtained by RAFT polymerization contains no heavy-metal catalyst and therefore can enhance the storage stability of an adhesive composition to the highest level.

In living radical polymerization, any process, such as batch process, semi-batch process, dry/continuous polymerization process, or continuous stirred-tank reactor process (CSTR), may be employed. Additionally, the modes of polymerization are applicable to various forms of polymerization, such as bulk polymerization with no solvent, solution polymerization with a solvent, emulsion polymerization in aqueous emulsion, mini-emulsion polymerization, and dispersion polymerization.

The type of the living radical polymerization method is not limited to a particular technique, and various polymerization methods, such as reversible addition-fragmentation chain-transfer polymerization (RAFT polymerization) method, nitroxide mediated polymerization (NMP) method, atom transfer radical polymerization (ATRP) method, organotellurium-mediated living radical polymerization (TERP) method, organic organoantimony-mediated living radical polymerization (SBRP) method, organobismuth-mediated living radical polymerization (BIRP) method, and iodine transfer polymerization method, can be employed. Among those, RAFT polymerization method, NMP method, and ATRP method are preferred, and RAFT polymerization method is more preferred, in terms of the controllability of a polymerization process and of ease of operation.

In the RAFT polymerization method, the controlled polymerization proceeds through a reversible chain-transfer reaction in the presence of a particular polymerization controller (RAFT agent) and a commonly-used free-radical polymerization initiator. As the RAFT agent, various known RAFT agents, such as dithioester compounds, xanthate compound, trithiocarbonate compounds, and dithiocarbamate compounds, can be used.

As the RAFT agent, a monofunctional agent having only one reactive site may be used, or a bifunctional or higher agent may be used. A bifunctional RAFT agent is preferably used because a block copolymer having the A-(BA)$_n$ structure can be easily obtained in an efficient way by using a bifunctional RAFT agent.

Additionally, the amount of a RAFT agent used is appropriately changed depending on, for example, the monomer type used and the type of the RAFT agent.

As the polymerization initiator used in the polymerization process by the RAFT polymerization method, a known radical-polymerization initiator, such as an azo compound, an organic peroxide, or a persulfate, can be used, and an azo compound is preferably used because the use of an azo compound reduces the occurrence of a side reaction, which is to be removed for safety reasons, during the radical-polymerization.

Specific examples of the azo compound include 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], and 2,2'-azobis(N-butyl-2-methylpropionamide).

The radical-polymerization initiators may be used singly, or in combination of two or more kinds thereof.

The ratio of a radical-polymerization initiator to be used is not limited to a particular value, but the amount of the radical-polymerization initiator used relative to 1 mol of the RAFT agent is preferably 0.5 mol or less, more preferably 0.2 mol or less, to obtain a polymer having a lower molecular weight distribution. Additionally, the minimum amount of the radical-polymerization initiator used relative to 1 mol of the RAFT agent is 0.01 mol to allow the polymerization reaction to proceed in a stable manner. Accordingly, the amount of the radical-polymerization initiator used relative to 1 mol of the RAFT agent is preferably in the range from 0.01 mol to 0.5 mol, more preferably in the range from 0.05 mol to 0.2 mol.

The reaction temperature during the polymerization reaction by the RAFT polymerization method is preferably from 40° C. to 100° C., more preferably from 45° C. to 90° C., yet more preferably from 50° C. to 80° C. At a reaction temperature of 40° C. or higher, the polymerization reaction can proceed smoothly. At a reaction temperature of 100° C. or lower, the occurrence of a side reaction can be reduced, which reduces limitations with respect to available initiators and solvents.

In the NMP method, for example, a particular nitroxide-containing alkoxyamine compound is used as a living radical polymerization initiator, and polymerization is mediated by a nitroxide radical derived therefrom. In the invention, the nitroxide radical used is not limited to a particular type of radical, but a compound represented by Formula (4) is preferably used as the nitroxide compound, in terms of the controllability of a polymerization process to polymerize a monomer including an acrylate.

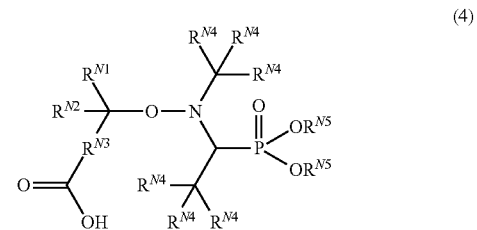

(4)

In Formula (4), $R^{N1}$ represents ethyl group, methyl group, or hydrogen atom, and $R^{N2}$ represents ethyl group, methyl group, or nitrile group, and $R^{N3}$ represents —(CH$_2$)$_m$—, and m represents an integer of 0 to 2, and $R^{N4}$ and $R^{N5}$ independently represent an alkyl group having 1 to 4 carbon atoms.

The nitroxide compound represented by the Formula (4) undergoes primary dissociation during heating at around a temperature of 70° C. to 80° C., which causes an addition reaction with a vinyl monomer. In this process, a polyfunctional polymeric precursor can be obtained by adding the nitroxide compound to a vinyl monomer having two or more vinyl groups. Then, the polymeric precursor can undergo secondary dissociation under heating to conduct living polymerization of the vinyl monomer.

In this case, a polymer having a narrower molecular weight distribution can be obtained because the polymeric precursor has two or more reactive sites per molecule. A bifunctional polymeric precursor having two reactive sites per molecule is preferably used because a block copolymer having the A-(BA)$_n$ structure can be easily obtained in an efficient way.

Additionally, the amount of a nitroxide compound used is appropriately changed depending on, for example, the monomer type used and the type of the nitroxide compound.

In a case in which the block copolymer (B) is produced by the NMP method, 0.001 mol to 0.2 mol of a nitroxide radical represented by Formula (5) may be added to 1 mol of a nitroxide compound represented by the Formula (4) to conduct polymerization.

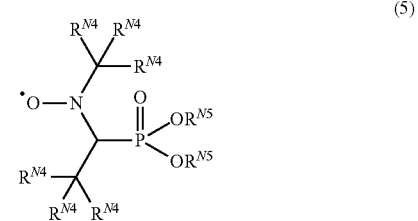

(5)

In Formula (5), $R^{N4}$ and $R^{N5}$ independently represent an alkyl group having 1 to 4 carbon atoms.

Addition of 0.001 mol or more of a nitroxide radical represented by the Formula (5) shortens the time required for the concentration of the nitroxide radical to reach steady state. This allows finer control of the polymerization process, whereby a polymer having a narrower molecular weight distribution can be obtained. In a case in which an excessively large amount of the nitroxide radical is added, the polymerization may not proceed. The amount of the nitroxide radicals added to 1 mol of the nitroxide compound is more preferably in the range from 0.01 mol to 0.5 mol, yet more preferably in the range from 0.05 mol to 0.2 mol.

The reaction temperature in the NMP method is preferably from 50° C. to 140° C., more preferably from 60° C. to 130° C., yet more preferably from 70° C. to 120° C., particularly preferably from 80° C. to 120° C. At a reaction temperature of 50° C. or higher, the polymerization reaction can proceed smoothly. At a reaction temperature of 140° C. or lower, the occurrence of a side reaction, such as radical chain-transfer, tends to be reduced.

In the ATRP method, the polymerization reaction is generally conducted using an organic halide and a transitional metal complex as an initiator and a catalyst, respectively. As the organic halide initiator, a monofunctional organic halide or a bifunctional or higher organic halide may be used. A bifunctional compound is preferably used because a block copolymer having the A-(BA)$_n$ structure can be easily obtained in an efficient way by using a bifunctional compound. Additionally, the halide is preferably a bromide or a chloride.

The reaction temperature in the ATRP polymerization method is preferably from 20° C. to 200° C., more preferably from 50° C. to 150° C. At a reaction temperature of 20° C. or higher, the polymerization reaction can proceed smoothly.

In a case in which a polymer having the A-(BA)$_n$ structure, such as an ABA triblock copolymer having the structure: block (a)-block (b)-block (a), is obtained by any of the living radical polymerization methods, the blocks may be sequentially polymerized to obtain the block copolymer of interest. However, the block copolymer of interest can preferably be obtained in a more efficient way by the following production method including two polymerization steps. For example, after an acrylic monomer is polymerized in a first polymerization step to obtain the acrylic polymer block (block (b)), a monomer mixture containing 30% by mass to 99% by mass of a maleimide compound and 1% by mass to 70% by mass of a styrene compound is polymerized in a second polymerization step to obtain the block (a). Thus, an ABA triblock copolymer having the structure: block (a)-block (b)-block (a), can be obtained. Compared to the method in which the blocks are sequentially polymerized to produce block copolymer of interest, the latter method can simplify the production process. Additionally, a higher-order block copolymer, such as a tetrablock copolymer, can be obtained by repeating the first and second polymerization steps.

In a case in which the production method including the first and second polymerization steps is employed, the bifunctional polymerization initiator or polymeric precursor is preferably used as a polymerization initiator.

In the invention, the polymerization of a block copolymer may be conducted, if necessary, in the presence of a chain transfer agent, independently of the polymerization method.

Any known chain transfer agent can be used, and specific examples of the chain transfer agent include alkyl thiol compounds having an alkyl group having 2 to 20 carbon atoms, such as ethanethiol, 1-propanethiol, 2-propanethiol, 1-butanethiol, 2-butanethiol, 1-hexanethiol, 2-hexanethiol, 2-methylheptane-2-thiol, 2-butylbutane-1-thiol, 1,1-dimethyl-1-pentanethiol, 1-octanethiol, 2-octanethiol, 1-decanethiol, 3-decanethiol, 1-undecanethiol, 1-dodecanethiol, 2-dodecanethiol, 1-tridecanethiol, 1-tetradecanethiol, 3-methyl-3-undecanethiol, 5-ethyl-5-decanethiol, tert-tetradecanethiol, 1-hexadecanethiol, 1-heptadecanethiol and 1-octadecanethiol; and additionally include mercaptoacetic acid, mercaptopropionic acid, 2-mercaptoethanol.

One or more chain transfer agents can be used.

In the invention, any known polymerization solvent can be used in the living radical polymerization, specifically including aromatic compounds, such as benzene, toluene, xylene, and anisole; ester compounds, such as methyl acetate, ethyl acetate, propyl acetate, and butyl acetate; ketone compounds, such as acetone and methyl ethyl ketone; and dimethylformamide, acetonitrile, dimethyl sulfoxide, alcohols, and water. Additionally, polymerization may be conducted using no polymerization solvent in a polymerization mode, such as bulk polymerization.

<Polymerization Initiator>

The adhesive composition of the invention may contain, if necessary, a polymerization initiator.

The adhesive composition of the invention may be cured by actinic radiation, such as ultraviolet radiation, visible radiation, or electron beam radiation, or by heat, though not particularly limited thereto. An appropriate polymerization initiator is used depending on each curing method.

In a case in which the curing process is conducted with actinic radiation, a photopolymerization initiator is preferably contained.

The photopolymerization initiator is not limited to a particular photopolymerization initiator, but is preferably a photo-radical initiator or a photo-anionic initiator, more preferably a photo-radical initiator. Specific examples of the photopolymerization initiator can include benzoins, such as benzoin, benzoin methyl ether, and benzoin propyl ether; acetophenones, such as acetophenone, 2,2-dimethoxy-2-phenylacetophenone, 2,2-diethoxy-2-phenylacetophenone, 1,1-dichloroacetophenone, 2-hydroxy-2-methyl-1-phenyl-propan-1-one, 1-hydroxycyclohexyl phenyl ketone, 2-methyl-1-[4-(methylthio)phenyl]-2-morpholinopropan-1-one, and N,N-dimethylaminoacetophenone; anthraquinones, such as 2-methylanthraquinone, 1-chloroanthraquinone, and 2-amylanthraquinone; thioxanthones, such as 2,4-dimethylthioxanthone, 2,4-diethylthioxanthone, 2-chlorothioxanthone, and 2,4-diisopropylthioxanthone; ketals, such as acetophenone dimethyl ketal and benzyl methyl ketal; benzophenones, such as benzophenone, methylbenzophenone, 4,4'-dichlorobenzophenone, 4,4'-bis(diethylamino)benzophenone, Michler's ketone, and 4-benzoyl-4'-methyldiphenyl sulfide; and 2,4,6-trimethylbenzoyldiphenylphosphine oxide, bis(2,6-dimethoxybenzoyl)-2,4,4'-trimethylpentylphosphine oxide, and camphorquinone. These photopolymerization initiators may be used singly, or in combination of two or more kinds thereof. Furthermore, a sensitizer, such as an amine, may be used in combination with a photopolymerization initiator.

Examples of a photo-cationic polymerization initiator include sulfonium salts, iodonium salts, and diazonium salts.

Examples of the sulfonium salts include triaryl sulfonium salts, such as triphenylsulfonium hexafluorophosphate, triphenylsulfonium hexafluoroantimonate, triphenylsulfonium tetrakis(pentafluorophenyl)borate, diphenyl-4-(phenylthio)phenylsulfonium hexafluorophosphate, diphenyl-4-(phenylthio)phenylsulfonium hexafluoroantimonate, 4,4'-bis[diphenyl sulfonio]diphenyl sulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-tolyl)sulfonio]-2-isopropylthioxanthone hexafluoroantimonate, 7-[di(p-tolyl)sulfonio]-2-isopropylthioxanthone tetrakis(pentafluorophenyl)borate, 4-phenylcarbonyl-4'-diphenyl sulfonio-diphenyl sulfide hexafluorophosphate, 4-(p-tert-butylphenylcarbonyl)-4'-diphenylsulfoniodiphenylsulfide hexafluoroantimonate, and 4-(p-tertbutylphenylcarbonyl)-4'-di(p-tolyl)sulfoniodiphenylsulfide tetrakis(pentafluorophenyl)borate.

Examples of the iodonium salts include diaryl iodonium salts, such as diphenyliodonium tetrakis(pentafluorophenyl) borate diphenyliodonium hexafluorophosphate, diphenyliodonium hexafluoroantimonate, di(4-t-butylphenyl)iodonium hexafluorophosphate, di(4-t-butylphenyl)iodonium hexafluoroantimonate, tolylcumyliodonium tetrakis(pentafluorophenyl)borate, (4-methylphenyl) [4-(2-methylpropyl) phenyl]hexafluorophosphate, di(4-nonylphenyl)iodonium hexafluorophosphate, and di(4-alkyl phenyl)iodonium hexafluorophosphate.

Examples of the diazonium salts include benzenediazonium hexafluoroantimonate and benzenediazonium hexafluorophosphate.

The source of actinic radiation in the case in which the curing process is conducted with actinic radiation depends on the properties of the photopolymerization initiator and is selected from irradiation of light or electron beams by, for example, but not limited to, a high pressure mercury lamp, a low pressure mercury lamp, an electron beam irradiator, a halogen lamp, a light emitting diode, or a semiconductor laser.

In a case in which the curing process is conducted with heat treatment, a thermal polymerization initiator is preferably contained.

Examples of the thermal polymerization initiator include, but are not particularly limited to, azo, peroxide, persulfate, and redox initiators.

Examples of the azo initiators include, but are not limited to, 2,2'-azobis(4-methoxy-2,4-dimethylvaleronitrile), 2,2'-azobis(2-amidinopropane) dihydrochloride, 2,2'-azobis(2,4-dimethylvaleronitrile), 2,2'-azobis(isobutyronitrile), 2,2'-azobis-2-methylbutyronitrile, 1,1-azobis(1-cyclohexanecarbonitrile), 2,2'-azobis(2-cyclopropylpropionitrile), and 2,2'-azobis (methylisobutyrate). Examples of the peroxide initiators include, but are not limited to, benzoyl peroxide, acetyl peroxide, lauroyl peroxide, decanoyl peroxide, dicetyl peroxydicarbonate, t-butyl peroxyisopropylmonocarbonate, di(4-t-butylcyclohexyl) peroxydicarbonate, di(2-ethylhexyl) peroxydicarbonate, t-butylperoxypivalate, t-butylperoxy-2-ethylhexanoate, and dicumyl peroxide.

Examples of the persulfate initiators include, but are not limited to, potassium persulfate, sodium persulfate, and ammonium persulfate.

Examples of the redox initiators include, but are not limited to, combinations of the above-described persulfate initiators with reducing agents, such as sodium hydrogen metabisulfite and sodium hydrogen sulfite; systems based on organic peroxides and tertiary amines, such as a system based on benzoyl peroxide and dimethylaniline; and systems based on organic hydroperoxydes and transition metals, such as a system based on cumene hydroperoxide and cobalt naphthenate. Other initiators include, but are not limited to, pinacols, such as 1,1,2,2-tetraphenyl-1,2-ethanediol.

As the thermal polymerization initiator, any one selected from the group consisting of azo and peroxide initiators is preferred.

These thermal polymerization initiators may be used singly, or in combination of two or more kinds thereof.

The thermal curing is not limited to particular conditions. The curing temperature is preferably in the range from 50° C. to 250° C., more preferably in the range from 70° C. to 200° C., though the curing temperature varies depending on, for example, the types of a used thermal polymerization initiator and added compounds. The curing time is preferably in the range from 1 minute to 24 hours, though the curing time varies depending on, for example, a used polymerization initiator, monomer, solvent, and reaction temperature.

The polymerization initiators may be used singly, or in combination of two or more kinds thereof.

The content of the polymerization initiator is preferably from 0.01 parts by mass to 50 parts by mass, more preferably from 0.1 parts by mass to 30 parts by mass, yet more preferably from 0.5 parts by mass to 10 parts by mass, relative to 100 parts by mass of the polymerizable monomer.

<Other Components>

The adhesive composition of the invention may contain other components, in addition to the polymerizable monomer (A), the block copolymer (B), and the polymerization initiator.

As the other components, appropriate amounts of, for example, a stabilizing agent, a curing accelerator, a plasticizing agent, a thickener, particles, a coloring agent, a flavoring agent, a solvent, and/or a strength improver as conventionally used and incorporated in adhesive compositions can be incorporated in accordance with various purposes, to the extent that, for example, the curing property and the bond strength are not compromised in the adhesive composition.

Examples of the stabilizing agent include (1) anionic polymerization-inhibitors, such as sulfur dioxide and an aliphatic sulfonic acid such as methanesulfonic acid, an aromatic sulfonic acid such as p-toluenesulfonic acid, boron trifluoride complexes such as boron trifluoride methanol and boron trifluoride diethyl ether, $HBF_4$, and trialkyl borate; and (2) radical-polymerization-inhibitors, such as hydroquinone, hydroquinone monomethyl ether, t-butylcatechol, catechol, and pyrogallol. These stabilizing agents may be used singly, or in combination of two or more kinds thereof.

Any known curing accelerator can be used as the curing accelerator. Examples of the curing accelerator include polyether compounds, calixarenes, thiacalixarenes, pyrogallolarenes, and onium salts. These curing accelerators may be used singly, or in combination of two or more kinds thereof.

Additionally, examples of the plasticizing agent include triethyl acetylcitrate, tributyl acetylcitrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis (2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic triglyceride, 2-ethylhexyl benzoate, and dipropylene glycol dibenzoate. Among those, tributyl acetylcitrate, dimethyl adipate, dimethyl phthalate, 2-ethylhexyl benzoate, and dipropylene glycol dibenzoate are preferred in terms of excellent compatibility with the polymerizable monomer and of high plasticizing efficiency. These plasticizing agents may be used singly, or in combination of two or more kinds thereof.

Examples of the thickener include polymethylmethacrylate, copolymers of methyl methacrylate and an acrylate ester, copolymers of methyl methacrylate and another methacrylate ester, acrylic rubbers, polyvinyl chloride, polystyrene, cellulose esters, polyalkyl-2-cyanoacrylate esters, and ethylene-vinyl acetate copolymers. These thickeners may be used singly, or in combination of two or more kinds thereof.

The particles optionally incorporated in the adhesive composition adjust the thickness of the adhesive layer formed when the adhesive composition is used.

The average particle diameter of the particles is preferably from 10 μm to 200 μm, more preferably from 15 μm to 200 μm, yet more preferably from 15 μm to 150 μm.

The material of the particles is any material as long as the material is insoluble in the polymerizable monomer used and causes no change in, for example, the polymerization process, and is not limited to a particular material. Examples of the material include thermoplastic resins, such as polyethylene, polypropylene, polymethylpentene, polyvinyl chloride, polytetrafluoroethylene, polyethylene terephthalate, polybutylene terephthalate, polysulfone, and polyphenylene oxide; cross-linked resins, such as unsaturated polyester, divinylbenzene polymer, divinylbenzene-styrene copolymer, divinylbenzene-(meth)acrylate copolymer, and diallyl phthalate polymer; inorganic compounds, such as spherical silica materials, glass beads, and glass fibers; silicone compounds; and organic-inorganic composite particles comprising an organic polymer backbone and a polysiloxane backbone.

Additionally, the content of the particles is preferably from 0.1 parts by mass to 10 parts by mass, more preferably from 1 part by mass to 5 parts by mass, yet more preferably from 1 part by mass to 3 parts by mass, relative to 100 parts by mass of the polymerizable monomer, though not particularly limited thereto. In the range from 0.1 parts by mass to 10 parts by mass, the curing rate and the bond strength are less affected.

The average particle diameter of the particles in the invention is an average diameter on the volume basis, measured by a laser diffraction particle size analyzer.

EXAMPLES

Now, the invention will be specifically described below by way of Examples. However, the invention is not limited to these Examples. Additionally, unless otherwise expressly stated, the words "parts" and "percent (%)" in the following description mean "parts by mass" and "% by mass," respectively.

Additionally, the SP value of each block in a thermoplastic elastomer was calculated by the above-described method.

[1] Production of Block Copolymers A to K

Methods of analyzing polymers obtained in Production Examples will be described below.
<Molecular Weight Measurement>
Each obtained polymer was subjected to the gel permeation chromatography (GPC) under the following conditions to determine the number-average molecular weight (Mn) and weight-average molecular weight (Mw) in terms of polystyrene standards. Additionally, the molecular weight distribution (Mw/Mn) was calculated from the determined molecular weight values.
—Measurement Conditions—
Column: TSKGEL SUPERMULTIPOREHZ-M manufactured by Tosoh Corporation, 4 columns;
Solvent: tetrahydrofuran;
Temperature: 40° C.;
Detector: differential refractometer (RI);
Flow rate: 600 μL/min.
<Composition Ratio of Polymer>
The composition ratio of each obtained polymer was identified or calculated by $^1$H-NMR measurement.

<Glass Transition Temperature (Tg)>
The glass transition temperature (Tg) of each obtained polymer was determined as the point of intersection between the baseline of a heat flux curve obtained using a differential scanning calorimeter and the tangent line of the heat flux curve at the inflection point. The heat flux curve was obtained under conditions where about 10 mg of a sample was cooled down to −50° C., maintained at the same temperature for 5 minutes, and then heated at a rate of 10° C./min to 300° C., and subsequently cooled down to −50° C., maintained at the same temperature for 5 minutes, and then heated at a rate of 10° C./min to 350° C.

Measuring instrument: DSC6220 manufactured by SII NanoTechnology Inc.;
Measurement atmosphere: nitrogen atmosphere.

In the measurement of the Tg of each acrylic polymer block (b), the polymer obtained in each Production Example was used as a sample. Additionally, each of the block copolymers obtained in Examples and Comparative Examples can be used as a sample to determine the Tg of each polymer block (a) (as well as the Tg of each acrylic polymer block (b)).

Synthesis of RAFT Agent: Synthesis of 1,4-Bis{(n-dodecylsulfanylthiocarbonyl)sulfanylmethyl}benzene Into an eggplant-shaped flask, 1-dodecanethiol (42.2 g), a 20% KOH aqueous solution (63.8 g), and trioctylmethyl ammonium chloride (1.5 g) were placed and cooled on ice, and carbon disulfide (15.9 g) and tetrahydrofuran (hereinafter also referred to as "THF") (38 mL) were added to the mixture and the resulting mixture was stirred for 20 minutes. A solution of α,α'-dichloro-p-xylene (16.6 g) in THF (170 mL) was added dropwise to the mixture for 30 minutes. The reaction was allowed to proceed at room temperature (25° C.; the same applies hereafter) for 1 hour, and the reaction mixture was then extracted with chloroform, washed with pure water, dried over anhydrous sodium sulfate, and then concentrated on a rotary evaporator. The obtained crude product was purified by column chromatography, and then subjected to recrystallization from ethyl acetate to give 1,4-bis{(n-dodecylsulfanylthiocarbonyl)sulfanylmethyl}benzene (hereinafter also referred to as "DLBTTC") represented by the following Formula (R) in a yield of 80%. The peaks from the product of interest were observed at 7.2 ppm, 4.6 ppm, and 3.4 ppm by $^1$H-NMR measurement.

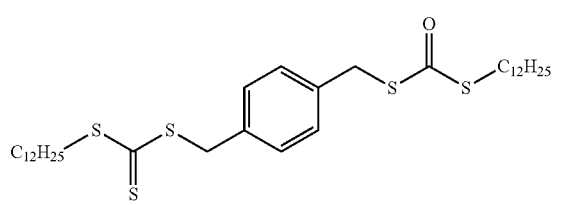

(R)

<Production of Polymer 1>
Into a 1 L flask equipped with a stirrer and a thermometer, the RAFT agent (DLBTTC) obtained in Synthesis Example 1 (3.0 g), 2,2'-azobis(2-methylbutyronitrile) (hereinafter also referred to as "ABN-E") (0.17 g), ethyl acrylate (EA, 456 g), and anisole (81.0 g) were placed, and the resulting mixture was degassed thoroughly by nitrogen bubbling to start polymerization in an incubator at 60° C. After 3 hours 30 minutes, the mixture was cooled down to room temperature to stop the reaction. The above polymerization solution was subjected to reprecipitation in hexane and the resulting precipitate was purified and dried under vacuum to obtain a Polymer 1. The molecular weight of the obtained Polymer 1 was determined as follows by GPC (gel permeation chromatography) measurement (in terms of polystyrene standards): Mn, 72,100; Mw, 78,600; Mw/Mn, 1.09.

<Production of Polymer 2>

A Polymer 2 was obtained in the same manner as in the production of the Polymer 1, except that n-butyl acrylate (BA) was used in addition to ethyl acrylate, and the amounts of the components used were changed as described in Table 1, and the reaction time was appropriately changed. The molecular weight of the Polymer 2 was measured and presented in Table 1. Additionally, the $^1$H-NMR measurement determined that the composition ratio of ethyl acrylate and n-butyl acrylate in the polymer was ethyl acrylate/n-butyl acrylate=25/75 (% by mass).

<Production of Polymer 3>

A Polymer 3 was obtained in the same manner as in the production of the Polymer 1, except that n-butyl acrylate and 2-ethylhexyl acrylate (HA) were used in addition to ethyl acrylate, and the amounts of the components used were changed as described in Table 1, and the reaction time was appropriately changed. The molecular weight of the Polymer 3 was measured and presented in Table 1. Additionally, the $^1$H-NMR measurement determined that the composition ratio of n-butyl acrylate and 2-ethylhexyl acrylate in the polymer was n-butyl acrylate/2-ethylhexyl acrylate=76/24 (% by mass).

<Production of Polymer 4>

A Polymer 4 was obtained in the same manner as in the production of the Polymer 3, except that the amount of DLBTTC used was changed as described in Table 1, and the reaction time was appropriately changed. The molecular weight of the Polymer 4 was measured and presented in Table 1. Additionally, the $^1$H-NMR measurement determined that the composition ratio of n-butyl acrylate and 2-ethylhexyl acrylate in the polymer was n-butyl acrylate/2-ethylhexyl acrylate=75/25 (% by mass).

<Production of Polymer 5>

A Polymer 5 was obtained in the same manner as in the production of the Polymer 1, except that methyl acrylate (MA) was used in addition to ethyl acrylate, and the amounts of the components used were changed as described in Table 1, and the reaction time was appropriately changed. The molecular weight of the Polymer 5 was measured and presented in Table 1.

<Production of Polymer 6>

A Polymer 6 was obtained in the same manner as in the production of the Polymer 3, except that the amounts of the components used were changed as described in Table 1, and the reaction time was appropriately changed. The molecular weight of the Polymer 6 was measured and presented in Table 1. Additionally, the $^1$H-NMR measurement determined that the composition ratio of n-butyl acrylate and 2-ethylhexyl acrylate in the polymer was n-butyl acrylate/2-ethylhexyl acrylate=25/75 (% by mass).

<Production of Polymer 7>

A Polymer 7 was obtained in the same manner as in the production of the Polymer 1, except that isobornyl acrylate (IBXA) was used in addition to ethyl acrylate, and the amounts of the components used were changed as described in Table 1, and the reaction time was appropriately changed. The molecular weight of the Polymer 7 was measured and presented in Table 1. Additionally, the $^1$H-NMR measurement determined that the composition ratio of ethyl acrylate and isobornyl acrylate in the polymer was ethyl acrylate/isobornyl acrylate=55/45 (% by mass).

TABLE 1

| | | Polymer 1 | Polymer 2 | Polymer 3 | Polymer 4 | Polymer 5 | Polymer 6 | Polymer 7 |
|---|---|---|---|---|---|---|---|---|
| Monomer | MA | | | | | 392 | | |
| | EA | 456 | 136 | | | | | 232 |
| | BA | | 409 | 474 | 474 | | 109 | |
| | HA | | | 158 | 158 | | 326 | |
| | IBXA | | | | | | | 193 |
| RAFT agent | DLBTTC | 3.0 | 3.0 | 3.0 | 1.5 | 3.0 | 2.9 | 3.3 |
| Polymerization initiator | ABN-E | 0.17 | 0.17 | 0.17 | 0.09 | 0.17 | 0.16 | 0.18 |
| Solvent | Anisole | 81.0 | 96.8 | 112 | 112 | 166 | 85 | 129 |
| Molecular weight | Mn | 72,100 | 74,300 | 72,100 | 175,000 | 71,200 | 72,200 | 70,600 |
| | Mw | 78,600 | 83,200 | 81,500 | 201,300 | 79,700 | 82,300 | 79,800 |
| | Mw/Mn | 1.09 | 1.12 | 1.13 | 1.15 | 1.12 | 1.14 | 1.13 |

In Table 1, the amount of each composition component is in g.

Production Example 1: Production of Block Copolymer A

Into a 1 L flask equipped with a stirrer and a thermometer, 2-{[(2-carboxyethyl)sulfanylthiocarbonyl] sulfanyl}propanoic acid (0.70 g), ABN-E (0.11 g), N-phenylmaleimide (PhMI, 23.9 g), styrene (St, 14.4 g), and anisole (78.3 g) were placed, and the resulting mixture was degassed thoroughly by nitrogen bubbling to start polymerization in an incubator at 70° C. After 2 hours, the mixture was cooled down to room temperature to stop the reaction, and ethyl acrylate (193.5 g) and anisole (30.2 g) were then placed into the flask, and the resulting mixture was degassed thoroughly by nitrogen bubbling to start polymerization in an incubator at 70° C. After 6 hours, anisole (120.5 g) was placed into the flask, and the resulting mixture was cooled down to room temperature to stop the reaction, and N-phenylmaleimide (28.7 g), styrene (18.7 g), and anisole (19.4 g) were then placed into the flask, and the resulting mixture was degassed thoroughly by nitrogen bubbling to start polymerization in an incubator at 70° C. After 8 hours, anisole (171.7 g) was placed into the flask, and the resulting mixture was cooled down to room temperature to stop the reaction. The quenched polymerization solution was subjected to reprecipitation in methanol and the resulting precipitate was purified and dried under vacuum to obtain a block copolymer A. The molecular weight of the obtained block copolymer A was determined as follows: Mn, 86,500; Mw, 124,000; Mw/Mn, 1.43.

The block copolymer A was a triblock copolymer having the structure: polymer block (a)-polymer block (b)-polymer block (a). The $^1$H-NMR measurement determined that the composition ratio of N-phenylmaleimide and styrene in the polymer block (a) was N-phenylmaleimide/styrene=61/39 (% by mass) and the composition ratio of the polymer block (a) to the polymer block (b) was the block (a)/the block (b)=32/68 (% by mass).

Production Example 2: Production of Block Copolymer B

Into a 1 L flask equipped with a stirrer and a thermometer, 2-{[(2-carboxyethyl)sulfanylthiocarbonyl]sulfanyl}propanoic acid (0.70 g), ABN-E (0.11 g), N-phenylmaleimide (24.0 g), styrene (12.3 g), α-methylstyrene (αMeSt, 2.5 g), and anisole (78.4 g) were placed, and the resulting mixture was degassed thoroughly by nitrogen bubbling to start polymerization in an incubator at 70° C. After 4.5 hours, the mixture was cooled down to room temperature to stop the reaction, and ethyl acrylate (97.8 g), butyl acrylate (49.0 g), 2-methoxyethyl acrylate (C-1, 49.0 g), and anisole (29.3 g) were placed into the flask, and the resulting mixture was degassed thoroughly by nitrogen bubbling to start polymerization in an incubator at 70° C. After 4.5 hours, anisole (122.0 g) was placed into the flask, and the resulting mixture was cooled down to room temperature to stop the reaction, and N-phenylmaleimide (28.8 g), styrene (15.9 g), α-methylstyrene (3.2 g), and anisole (19.4 g) were then placed into the flask, and the resulting mixture was degassed thoroughly by nitrogen bubbling to start polymerization in an incubator at 70° C. After 10 hours, anisole (167.7 g) was placed into the flask, and the resulting mixture was cooled down to room temperature to stop the reaction. The quenched polymerization solution was subjected to reprecipitation in methanol and the resulting precipitate was purified and dried under vacuum to obtain a block copolymer B. The molecular weight of the obtained block copolymer B was determined as follows: Mn, 76,600; Mw, 122,000; Mw/Mn, 1.59.

The block copolymer B was a triblock copolymer having the structure: polymer block (a)-polymer block (b)-polymer block (a). The $^1$H-NMR measurement determined that the composition ratio of N-phenylmaleimide, styrene, and α-methylstyrene in the polymer block (a) was N-phenylmaleimide/styrene/α-methylstyrene=61/32/7 (% by mass) and the composition ratio of ethyl acrylate, butyl acrylate, and 2-methoxyethyl acrylate in the polymer block (b) was ethyl acrylate/butyl acrylate/2-methoxyethyl acrylate=50/25/25 (% by mass). The composition ratio of the polymer block (a) to the polymer block (b) was the block (a)/the block (b)=31/69 (% by mass).

Production Example 3: Production of Block Copolymer C

Into a 1 L flask equipped with a stirrer and a thermometer, the Polymer 1 (100.0 g), ABN-E (0.05 g), N-phenylmaleimide (27.0 g), styrene (17.7 g), and anisole (391 g) were placed, and the resulting mixture was degassed thoroughly by nitrogen bubbling to start polymerization in an incubator at 75° C. After 3 hours, the mixture was cooled down to room temperature to stop the reaction. The quenched polymerization solution was subjected to reprecipitation in methanol and the resulting precipitate was purified and dried under vacuum to obtain a block copolymer C.

Production Examples 4 to 11: Production of Block Copolymers D, E, F, Q H, I, J, and K Block copolymers D, E, F, Q H, I, J, and K were independently obtained in the same manner as in Production Example 3, except that the types and amounts of the raw materials used were changed as described in Table 2, and the reaction time was appropriately changed.

TABLE 2

| | | Production Example No. | | | | | | | | |
|---|---|---|---|---|---|---|---|---|---|---|
| | | Production Example 3 | Production Example 4 | Production Example 5 | Production Example 6 | Production Example 7 | Production Example 8 | Production Example 9 | Production Example 10 | Production Example 11 |
| Monomer | PhMI | 27.0 | 27.0 | 27.0 | 27.0 | 64.0 | 13.2 | 27.0 | 26.7 | 27.3 |
| | St | 17.7 | 17.7 | 17.7 | 17.7 | 7.7 | 57.1 | 17.6 | 17.4 | 17.8 |
| Polymer | Polymer 1 | 100 | | | | 100 | 100 | | | |
| | Polymer 2 | | 100 | | | | | | | |
| | Polymer 3 | | | 100 | | | | | | |
| | Polymer 4 | | | | 100 | | | | | |
| | Polymer 5 | | | | | | | 100 | | |
| | Polymer 6 | | | | | | | | 100 | |
| | Polymer 7 | | | | | | | | | 100 |
| Polymerization initiator | ABN-E | 0.05 | 0.05 | 0.05 | 0.02 | 0.05 | 0.05 | 0.05 | 0.05 | 0.05 |
| Solvent | Anisole | 391 | 391 | 391 | 391 | 354 | 399 | 390 | 383 | 394 |

In Table 2, the amount of each composition component is in g.

The molecular weight, the composition ratios of components determined by $^1$H-NMR measurement, SP values, and Tg values in the polymer block (a) (block (a)) and the polymer block (b) (block (b)), and the composition ratio between the polymer block (a) and the polymer block (b) in each of the block copolymers A to K obtained in Production Examples are presented in Table 3.

TABLE 3

| Block copolymer No. | | | A | B | C | D | E | F |
|---|---|---|---|---|---|---|---|---|
| Block (a) | Composition ratio (% by mass) | PhMI | 61 | 61 | 62 | 62 | 62 | 62 |
| | | St | 39 | 32 | 38 | 38 | 38 | 38 |
| | | αMeSt | | 7 | | | | |
| | SP value [(cal/cm$^3$)$^{1/2}$] | | 13.0 | 13.0 | 13.0 | 13.0 | 13.0 | 13.0 |
| | Tg (° C.) | | 218 | 232 | 220 | 221 | 219 | 221 |
| Block (b) | Composition ratio (% by mass) | MA | | | | | | |
| | | EA | 100 | 50 | 100 | 25 | | |
| | | BA | | 25 | | 75 | 76 | 75 |
| | | HA | | | | | 24 | 25 |
| | | C-1 | | 25 | | | | |
| | | IBXA | | | | | | |
| | SP value [(cal/cm$^3$)$^{1/2}$] | | 10.2 | 10.1 | 10.2 | 9.9 | 9.7 | 9.7 |
| | Tg (° C.) | | −10 | −23 | −11 | −33 | −45 | −43 |
| Block copolymer | Molecular weight | Mn | 86,500 | 76,600 | 103,300 | 105,100 | 102,600 | 244,400 |
| | | Mw | 124,000 | 122,000 | 121,000 | 125,000 | 125,000 | 306,000 |
| | | Mw/Mn | 1.43 | 1.59 | 1.17 | 1.19 | 1.22 | 1.25 |
| | Block (a) (% by mass) | | 32 | 31 | 30 | 29 | 30 | 28 |
| | Block (b) (% by mass) | | 68 | 69 | 70 | 71 | 70 | 72 |

| Block copolymer No. | | | G | H | I | J | K |
|---|---|---|---|---|---|---|---|
| Block (a) | Composition ratio (% by mass) | PhMI | 81 | 34 | 61 | 62 | 61 |
| | | St | 19 | 66 | 39 | 38 | 39 |
| | | αMeSt | | | | | |
| | SP value [(cal/cm$^3$)$^{1/2}$] | | 13.7 | 12.0 | 13.0 | 13.0 | 13.0 |
| | Tg (° C.) | | 257 | 155 | 219 | 219 | 220 |
| Block (b) | Composition ratio (% by mass) | MA | | | 100 | | |
| | | EA | 100 | 100 | | | 55 |
| | | BA | | | | 25 | |
| | | HA | | | | 75 | |
| | | C-1 | | | | | |
| | | IBXA | | | | | 45 |
| | SP value [(cal/cm$^3$)$^{1/2}$] | | 10.2 | 10.2 | 10.6 | 9.4 | 10.1 |
| | Tg (° C.) | | −10 | −10 | 8 | −60 | 22 |
| Block copolymer | Molecular weight | Mn | 102,000 | 100,000 | 102,600 | 103,900 | 102,500 |
| | | Mw | 120,000 | 119,000 | 121,000 | 124,000 | 124,000 |
| | | Mw/Mn | 1.18 | 1.19 | 1.18 | 1.19 | 1.21 |
| | Block (a) (% by mass) | | 29 | 33 | 30 | 30 | 31 |
| | Block (b) (% by mass) | | 71 | 67 | 70 | 70 | 69 |

[2] Production of Adhesive Composition

Example 1

The block copolymer A (100 parts) was mixed and dissolved in 500 parts of ethoxyethyl 2-cyanoacrylate incorporated with sulfur dioxide and hydroquinone at concentrations of 20 ppm and 1000 ppm, respectively, with stirring overnight at 23° C. to produce an adhesive composition.

Examples 2 to 6 and 9 to 12 and Comparative Examples 2 and 4

Adhesive compositions of Examples 2 to 6 and 9 to 12 and Comparative Examples 2 and 4 were produced in the same manner as in Example 1, except that the block copolymer A was replaced with each copolymer described in Table 4.

Example 7

The block copolymer A (100 parts) was mixed and dissolved in 500 parts of 2-octyl 2-cyanoacrylate incorporated with sulfur dioxide and hydroquinone at concentrations of 20 ppm and 1000 ppm, respectively, with stirring overnight at 23° C. to produce an adhesive composition.

Example 8

An adhesive composition was produced in the same manner as in Example 7, except that the incorporated amount of 2-octyl 2-cyanoacrylate was changed.

Comparative Example 1

An adhesive composition was produced in the same manner as in Example 1, except that the block copolymer A was not used.

Comparative Example 3

An adhesive composition was produced in the same manner as in Example 7, except that the block copolymer A was not used.

TABLE 4

| | Copolymer | | Polymerizable monomer | |
|---|---|---|---|---|
| | Type | Incorporated amount (parts) | Type | Incorporated amount (parts) |
| Example 1 | Block copolymer A | 100 | Ethoxyethyl 2-cyanoacrylate | 500 |
| Example 2 | Block copolymer B | 100 | Ethoxyethyl 2-cyanoacrylate | 500 |

TABLE 4-continued

| | Copolymer | | Polymerizable monomer | |
|---|---|---|---|---|
| | Type | Incorporated amount (parts) | Type | Incorporated amount (parts) |
| Example 3 | Block copolymer C | 100 | Ethoxyethyl 2-cyanoacrylate | 500 |
| Example 4 | Block copolymer D | 100 | Ethoxyethyl 2-cyanoacrylate | 500 |
| Example 5 | Block copolymer E | 100 | Ethoxyethyl 2-cyanoacrylate | 500 |
| Example 6 | Block copolymer F | 100 | Ethoxyethyl 2-cyanoacrylate | 500 |
| Example 7 | Block copolymer A | 100 | 2-Octyl 2-cyanoacrylate | 500 |
| Example 8 | Block copolymer A | 100 | 2-Octyl 2-cyanoacrylate | 300 |
| Example 9 | Block copolymer G | 100 | Ethoxyethyl 2-cyanoacrylate | 500 |
| Example 10 | Block copolymer H | 100 | Ethoxyethyl 2-cyanoacrylate | 500 |
| Example 11 | Block copolymer I | 100 | Ethoxyethyl 2-cyanoacrylate | 500 |
| Example 12 | Block copolymer J | 100 | Ethoxyethyl 2-cyanoacrylate | 500 |
| Comparative Example 1 | — | — | Ethoxyethyl 2-cyanoacrylate | 500 |
| Comparative Example 2 | Vamac | 100 | Ethoxyethyl 2-cyanoacrylate | 500 |
| Comparative Example 3 | — | — | 2-Octyl 2-cyanoacrylate | 500 |
| Comparative Example 4 | Block copolymer K | 100 | Ethoxyethyl 2-cyanoacrylate | 500 |

The abbreviation in the table, except for those indicating block copolymers, represent the following materials:

Vamac: a thermoplastic elastomer, manufactured by Dupont Dow Elastomers L.L.C., trade name "VAMAC G" (ethylene/methyl acrylate/acrylic acid random copolymer).

[3] Evaluation of Adhesive Composition

<Oil Resistance of Cured Product 1>

Each of the adhesive compositions was poured into a mold having dimensions of 1 mm×10 mm×50 mm and was quickly cured using a curing accelerator (trade name "AA SETTER"; manufactured by Toagosei Co., Ltd.). Each cured product was immersed in a brake oil (trade name "GULF PRO GUARD BRAKE FLUID DOT4"; manufactured by Gulf Oil Corporation Ltd.) and maintained at 50° C. for 1 hour. Subsequently, the shape of each cured product was observed and grouped:
A: the shape was maintained;
B: a significant change in shape was observed.

<Oil Resistance of Cured Product 2>

Each of the adhesive compositions was poured into a mold having dimensions of 1 mm×10 mm×50 mm and was quickly cured using a curing accelerator (trade name "AA SETTER"; manufactured by Toagosei Co., Ltd.). Each cured product was immersed in gasoline and maintained at 50° C. for 1 hour. Subsequently, the shape of each cured product was observed and grouped:
A: the shape was maintained;
B: a significant change in shape was observed.

<Cooling/Heating Cycle Resistance>

An aluminium plate (having properties as specified in JIS A6061P) and a piece of an ABS resin (an ABS resin named "ABS-N-WN," manufactured by Shin-Kobe Electric Machinery Co., Ltd., was used) were bonded together by using each of the adhesive compositions of Examples 1 to 12 and Comparative Examples 1 to 4, and left to stand at 23° C. for 3 days for curing, after which the tensile-shear bond strength (the initial strength) was measured in accordance with JIS K 6861. After the bonding and curing, each sample was treated with 10 repeats of a cooling/heating cycle consisting of maintaining the temperature at −40° C. for 1 hour and then at 80° C. for 1 hour using a thermal shock testing apparatus, and the tensile-shear bond strength (the post-test strength) was then measured in the same manner as described above to calculate the percent retention as described below.

Percent retention (%)=(Post-test strength/Initial strength)×100

TABLE 5

| | Oil resistance of cured product 1 | Oil resistance of cured product 2 | Cooling/heating cycle resistance AL/ABS tensile-shear bond strength (N/mm$^2$) | | |
|---|---|---|---|---|---|
| | | | Initial strength | Post-test strength | Percent retention |
| Example 1 | A | A | 8.3 | 6.6 | 80% |
| Example 2 | A | A | 7.8 | 4.2 | 54% |
| Example 3 | A | A | 8.0 | 6.9 | 86% |
| Example 4 | A | A | 7.5 | 6.7 | 89% |
| Example 5 | A | A | 8.7* | 8.4* | 97% |
| Example 6 | A | A | 6.3 | 4.8 | 76% |
| Example 7 | A | A | 7.6 | 5.3 | 70% |
| Example 8 | A | A | 6.2 | 5.1 | 82% |
| Example 9 | A | A | 8.2 | 6.7 | 82% |
| Example 10 | A | A | 7.9 | 6.2 | 78% |
| Example 11 | A | A | 8.0 | 4.6 | 56% |
| Example 12 | A | A | 7.5 | 7.2 | 96% |
| Comparative Example 1 | B | A | 8.7* | 0.0 | 0% |
| Comparative Example 2 | B | A | 5.2 | 1.1 | 21% |
| Comparative Example 3 | A | B | 8.1 | 0.0 | 0% |
| Comparative Example 4 | A | A | 7.8 | 1.4 | 18% |

A single asterisk (*) denotes a breakage event in the base material of each ABS resin piece.

The results in Table 5 indicate that the adhesive compositions of Examples 1 to 12 exhibited more excellent oil resistance after curing process than the adhesive compositions of Comparative Examples 1 to 3, and also indicate that the percent retention in bond strength after the cooling/heating cycle test was 50% or more in all of Examples 1 to 12 and 30% or less in Comparative Examples 1 to 4.

INDUSTRIAL APPLICABILITY

The adhesive composition of the invention can be used as an adhesive in wide varieties of products and technical fields, including consumer products, the medical field, and other industrial fields, and is particularly useful for bonding vehicle components, electric appliance components, electronic components, and various types of footwear.

Additionally, the adhesive composition of the invention can be suitably used for bonding particularly between different types of adherends (for example, between a metal and a resin).

The disclosure of Japanese Patent Application No. 2017-087410, filed on Apr. 26, 2017, is incorporated herein by reference in its entirety.

All documents, patent applications, and technical specifications described in this specification are incorporated herein by reference to the same extent as if each individual document, patent application, or technical specification was specifically and individually indicated to be incorporated by reference.

The invention claimed is:

1. An adhesive composition, containing:
a polymerizable monomer (A), and
a block copolymer (B) including a polymer block (a) which comprises structural units derived from a styrene compound and from a maleimide compound, and an acrylic polymer block (b),
wherein the solubility parameter of the polymer block (a) is 10.0 or more;
the solubility parameter of the acrylic polymer block (b) is 9.0 or more;
the polymer block (a) contains the structural unit derived from a maleimide compound at a concentration from 30% by mass to 99% by mass with respect to the total mass of the polymer block (a);
the polymer block (a) has a glass transition temperature of 150° C. or higher; and
the polymer block (b) has a glass transition temperature of 20° C. or lower,
wherein the content of the block copolymer (B) is from 1 part by mass to 100 parts by mass relative to 100 parts by mass of the polymerizable monomer (A).

2. The adhesive composition according to claim 1, wherein the polymer block (a) contains the structural unit derived from a styrene compound at a concentration from 1% by mass to 70% by mass with respect to the total mass of the polymer block (a).

3. The adhesive composition according to claim 1, wherein the structural unit derived from a maleimide compound is a structural unit represented by the following Formula (1):

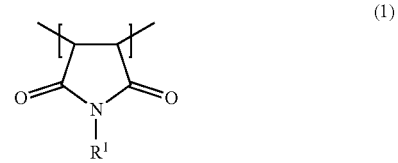

wherein, in Formula (1), $R^1$ represents hydrogen, an alkyl group having 1 to 3 carbon atoms, or -Ph-$R^2$; Ph represents phenylene group; and $R^2$ represents hydrogen, an alkyl group having 1 to 3 carbon atoms, hydroxy group, an alkoxy group having 1 or 2 carbon atoms, acetyl group, or halogen.

4. The adhesive composition according to claim 1, wherein the polymer block (a) comprises a structural unit derived from a vinyl compound having an amide group(s).

5. The adhesive composition according to claim 1, wherein the number-average molecular weight of the block copolymer (B) is from 10,000 to 500,000.

6. The adhesive composition according to claim 1, wherein the polymerizable monomer (A) is an ethylenically unsaturated compound.

7. The adhesive composition according to claim 1, wherein the polymerizable monomer (A) is at least one monomer selected from the group consisting of (meth)acrylate compounds and cyanoacrylate compounds.

8. The adhesive composition according to claim 1, which is an adhesive composition for bonding vehicle components.

* * * * *